Dec. 16, 1941.   J. E. DE GRAAF   2,266,174
HIGH TENSION DISCHARGE TUBE
Filed Nov. 2, 1938
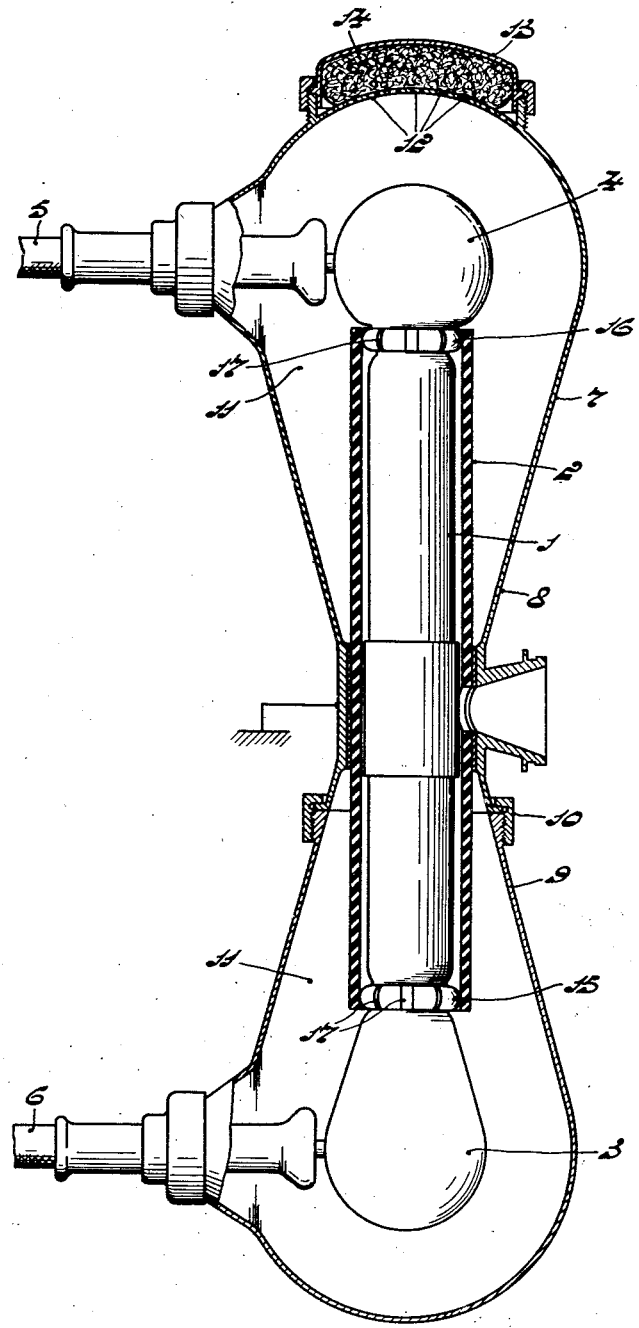
INVENTOR
JACOB ENGEL DE GRAAF
BY
ATTORNEY.

Patented Dec. 16, 1941

2,266,174

UNITED STATES PATENT OFFICE 2,266,174

HIGH TENSION DISCHARGE TUBE

Jacob Engel de Graaf, Eindhoven, Netherlands, assignor, by mesne assignments, to Hartford National Bank and Trust Company, Hartford, Conn., as trustee Application November 2, 1938, Serial No. 238,452
In Germany November 5, 1937

1 Claim. (Cl. 250—90)

My invention relates to high-tension discharge tubes, and more particularly to tubes which are enclosed within a protective housing.

As X-ray tubes are usually enclosed within a protective housing in order to obtain a shockproof construction, my invention is particularly useful with such tubes, and I shall describe the same in this connection. However, it is not limited thereto but may be used with other types of discharge tubes.

With such constructions it has been proposed to fill the space between the housing and the parts of the tube which are under high tension with a compressed gas, such as air, nitrogen or carbonic acid in order to increase the resistance to puncture. It has also been proposed to fill this space with an insulating liquid, such as oil.

Although the above measures increase the resistance to puncture, i. e., decrease the danger of arcing between the housing and the high-tension tube parts, they have the disadvantage that difficulties may be produced by leakage through the housing. More particularly, when a liquid, such as oil, leaks through the housing it may cause disagreeable contamination. A liquid brings about a considerable increase in weight and requires means permitting the expansion. If a compressed gas is used there is danger that even a very small amount of leakage will cause a considerable reduction in pressure without the operator of the tube becoming aware of the resulting reduction in the insulating between the housing and the tube.

Although this latter difficulty can be eliminated by permanently connecting a pump or a reservoir of compressed gas to the housing with suitable flexible conduits, this of course complicates the apparatus, makes it expensive, and hinders the operation thereof. In either case, it is necessary to provide the tube with a pressure gauge which must be constantly watched. Furthermore, each time the protective housing is opened, or whenever a considerable portion of the gas escapes due to other causes, the pressure must be reestablished.

The object of the present invention is to overcome the above difficulties and to increase the insulation resistance of the gaseous medium within the space between the protective housing and the high-tension tube parts.

In accordance with the invention I provide the atmosphere between the protective envelope and discharge tube with a mixture of air and saturated vapor which has a higher insulating capacity than dry air. An improvement in the gaseous insulating layer is obtained without any increase in pressure.

The vapor atmosphere may be maintained in a simple manner by providing a supply of a vaporizable material, for example a liquid, within the housing. In such cases a slight leakage in the protective housing would not be a disadvantage because any loss of the vapor would be automatically replenished. To maintain this liquid in a predetermined place and to prevent it from spreading throughout the space or from becoming lost by leakage, while at the same time insuring vaporization thereof, I prefer to provide within the housing a suitable absorbing material which is impregnated with the vaporizable liquid.

I am well aware of the fact that it has been proposed to place a hygroscopic material within the protective housing of a tube in order to prevent the insulating parts of the tube from becoming coated with a film of water. However, such a material does not produce vapor and does not provide an insulation better than that of dry air. In fact, when using the present invention it is possible to use in addition a hygroscopic substance to absorb any moisture which might enter the space.

In order that the invention may be clearly understood and readily carried into effect, I shall describe the same more fully with reference to the accompanying drawing, in which the single figure is a partly sectionized side view of an X-ray tube embodying the invention. The mounting of the tube broadly corresponds with that shown in the U. S. patent specification No. 2,051,157 of Cornelis Jan van Vliet.

As shown in the drawing, an X-ray tube 1 is arranged within a tube 2 of insulating material, such as glass or porcelain, X-ray tube 1 is supported at its ends in insulating tube 2 by means of spring members 15 and 16.

Two metal contact bodies 3 and 4 having rounded end surfaces are connected to the anode and cathode of the X-ray tube respectively, and extend from the ends of tube 2. Body 3 serves to absorb the heat developed in the anode during operation of the tube and to transfer this heat to the surroundings while remaining below a maximum permissible temperature. Metal body 4 is hollow and by its rounded shape reduces the electrical field intensity.

Current is supplied to the cathode by a two-conductor cable 5, whereas a single conductor cable 6 serves to supply current to the anode.

For clarity the cables are shown diagrammatically.

Surrounding tube 1 is a metal protective housing 7 which is adapted to be grounded when the tube is in operation so as to enable high tension to be applied between this housing and the metal members 3 and 4. Housing 7 comprises a member 8 which embraces the central portion of tube 2 and a second member 9 secured to member 8 by a nut 10. Members 8 and 9 are of bulbous shape and surround the ends of the tube with intermediate spaces 11.

As a rule the mid-point of the high-tension supply voltage (not shown) is grounded, and the potential difference between the housing 7 and each of the bodies 3 and 4 is made equal to one-half the operating voltage of the X-ray tube.

If the spaces 11 have insufficient insulating capacity, punctures may occur. To overcome this difficulty, or to allow a higher voltage to be applied to the tube with safety, I provide member 7 with apertures 12 and a removable cup 13. Within cup 13 is a suitable absorbent material, such as cotton waste, sawdust, cotton wool or the like, which is impregnated with a liquid capable of producing a vapor whose electrical insulation capacity is greater than that of dry air. For this purpose I may use $CCl_4$, $CHCl_3$, bromine. However, I prefer to use carbon tetrachloride because it has a high vapor tension, its vapor increases the insulation capacity of the air to a marked extent, and at the same time it is incombustible, and does not affect the metal members of the structure.

Provided the liquid used does not chemically attack the structural parts of the housing or of the discharge tube, and at the same time has good insulating properties, it is also possible to dispense with the absorbent material and merely pour a small quantity of the liquid into the housing. In this case, of course, care must be taken that the liquid cannot escape through apertures in the wall of the housing. However, I prefer to use an absorbent material unless the vaporizable material which serves to increase the resistance to puncture is a fixed sublimable material such as iodine which may be used in carrying out the invention.

As shown, the liquid that develops the vapor is carried by the material 14 which is located near the cathode end of the tube. I do this because this portion of the tube has the lowest temperature and therefore the vaporized liquid will not condense on other portions of the tube. Thus, the vaporizable material is preferably arranged near that point of the housing which is least heated during the operation of the tube. A number of slits 17 permits the vapour developed in the member 8 to reach the space between the tube 2 and the vessel 1 and the space surrounded by the member 9.

While I have described my invention in connection with specific examples and applications, I do not wish to be limited thereto, but desire the appended claim to be construed as broadly as is permissible in view of the prior art.

What I claim is:

In combination, a high-tension discharge tube, a protective housing surrounding said tube with an intermediate space, and means to increase the resistance to puncture of the atmosphere within said space comprising an absorbent material within said space and disposed at a point which has the lowest temperature during operation of the tube, and a liquid carried by said material, the vapor of said liquid having higher electrical insulating properties than dry air.

JACOB ENGEL DE GRAAF.